Nov. 21, 1950     J. E. CHAPMAN     2,531,109
TRAVEL AND LOAD LIMIT SYSTEM FOR SCREW ACTUATORS
Filed June 19, 1944     2 Sheets-Sheet 1

INVENTOR.
JAMES E. CHAPMAN
BY
ATTORNEY

Patented Nov. 21, 1950

2,531,109

UNITED STATES PATENT OFFICE 2,531,109

TRAVEL AND LOAD LIMIT SYSTEM FOR SCREW ACTUATORS

James E. Chapman, Phoenix, Ariz., assignor to The Garrett Corporation, Los Angeles, Calif., a corporation of California Application June 19, 1944, Serial No. 540,987

1 Claim. (Cl. 192—142)

My invention relates to a power driven actuator for moving a mechanical part and having special utility for moving heavy parts, such as landing gear, bomb bay doors, etc. in aircraft.

It is an object of the invention to provide an actuator which will move a part positively into a desired position of operation, and will not at any time move the part to a position short of the prescribed position.

As an example of the use of the invention, landing gears may be mentioned wherein it is customary to provide a strut for taking the load from the wheels, which strut is swung from an angular position when the wheels are retracted to an upright or extended position when the wheels are lowered from the aircraft into position for landing. If the power mechanism for swinging the strut fails to move it fully into its load carrying position, injury to the landing gear may result and the aircraft may be wrecked.

It is an object of the invention to provide a power driven actuator wherein the motor continues to operate for a period of time after the part moved thereby has been brought into its required position, thereby assuring that the part will always reach its required position of operation and will not stop short of the same. Otherwise stated, the device has parts in such cooperation that the motor will revolve a greater number of times than is actually required thereof to bring the moved part into its required position. It is an important object of the invention to provide in a power driven actuator of this character yieldable means which permits the operation of the motor after the moved part has stopped in its required position of utility, the yielding means forming a part of the invention enabling the jack to continue to apply force to the moved part after it has stopped in its required position and absorbing the power delivered by the motor during the period of time it operates after the moved part has stopped in the required position.

A further object of the invention is to provide a power operated strut or actuator having power means which delivers power through a transmission mechanism to a member adapted to be connected to the part which is to be moved, this mechanism including therein a friction clutch through which the power is transmitted and which is arranged to yield or slip when the moved part reaches its intended position of operation.

A further object of the invention is to provide a power operated actuator such as set forth in the preceding paragraph having a cut-off for the power mechanism which acts to discontinue the application of power after slippage of the clutch occurs.

A further object of the invention is to provide a power operated actuator having a power driven member which drives a friction clutch and likewise drives a limit switch mechanism, wherein the friction clutch yieldably drives a member which is connected to the part to be moved, and wherein the limit switch mechanism is arranged to maintain the application of power to the clutch for a period of time after the driven member has been stopped as the result of the moved part into its operative position and whereby the movement of the power driven member will be continued through a distance of travel after movement of the member has been stopped.

Further objects and advantages of the invention will be brought out in the following part of the specification.

Referring to the drawings which are for illustrative purposes only,

Figure 1:
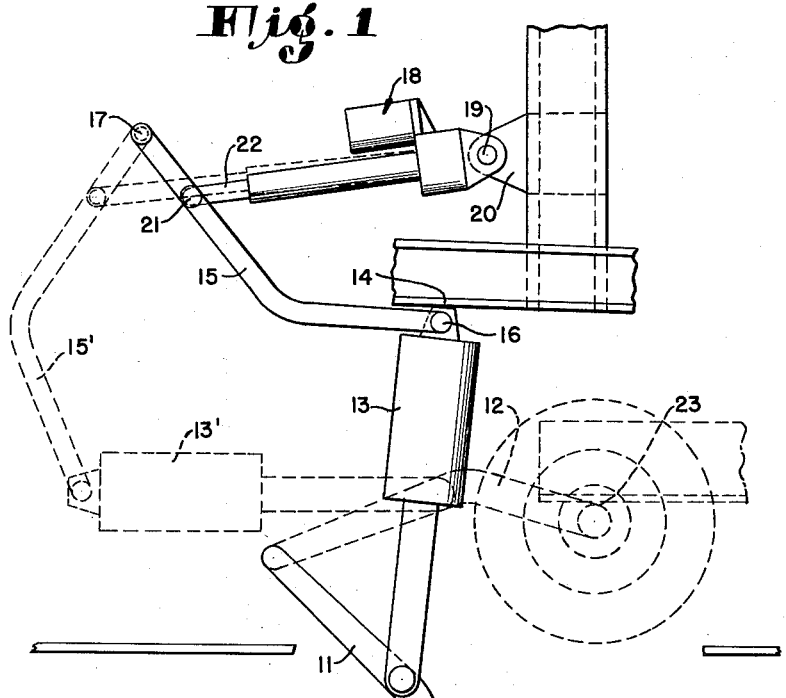
Fig. 1 is a schematic view showing the manner in which my invention is used for lowering and raising the landing wheels of an aircraft.

In Fig. 1 I show a portion of an aircraft landing gear comprising a wheel 10 mounted on a lever 11 adapted to swing from the lowered position shown in full lines to the raised or retracted position indicated by dotted lines 12. When in lowered position, the lever 11 is supported by a yieldable strut 13, such as an oleo strut, the upper end of which bears against a structural member 14 of the aircraft. The strut 13 is swingable from the position in which it is shown in full lines to its dotted line position 13' by an actuating lever 15, one end of which is connected by means of a pivot 16 to the upper end of the strut 17 and the other end of which is swingable on a hinge 17 supported within the aircraft.

An actuator 18 has its rear end connected by a hinge member 19 to a stationary bracket 20, and has its front end connected by means of a pivot member 21 to an intermediate point of the actuating lever 15 so that when the thrust bar or member 22 of the actuator 18 is moved leftward from the position in which it is shown, the actuating lever 15 will be carried from the position in which it is shown in full lines to its dotted line position 15'. When the lever 15 is brought into the position 15", the lever 11, which supports the wheel 10, will engage a stop 23, thereby preventing further leftward swinging movement of the lever 15 and of the member 22.

Figure 3:
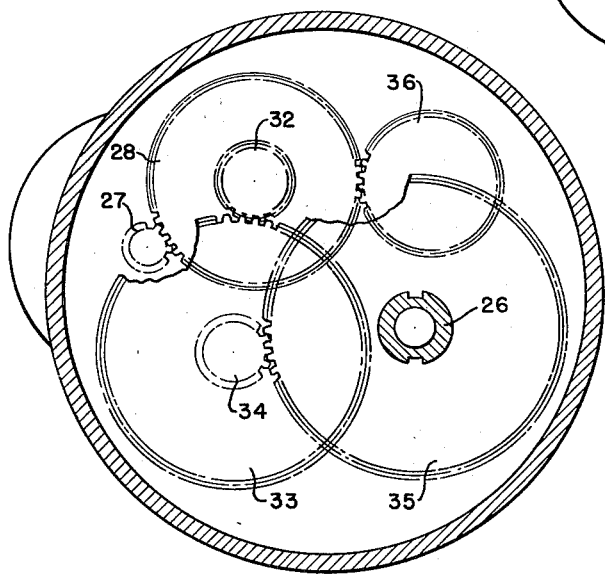
Fig. 3 is a section taken as indicated by the line 3—3 of Fig. 2.
Figure 2:
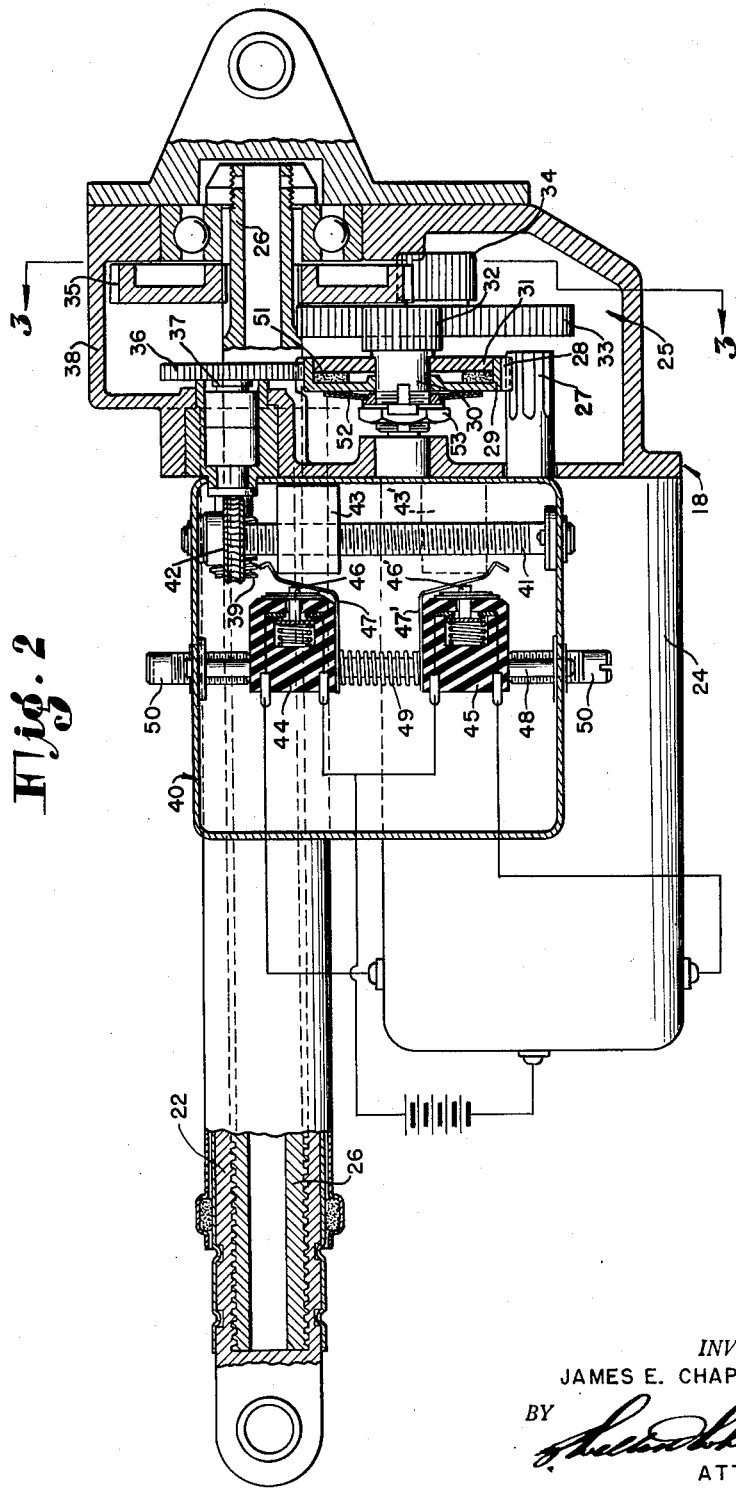
Fig. 2 is an enlarged partly sectioned view of the actuator, including an electrical diagram of the motor control circuit.

As shown in Figs. 2 and 3, the actuator 18 includes a power means 24 which is preferably a small high speed electric motor, a transmission mechanism 25 and a screw 26 which is driven by the transmission mechanism and extends within the member 22 in threaded engagement therewith so that rotation of the screw 26 will result in axial movement of the member 22 in a direction which depends upon the direction of rotation of the screw 26.

The motor 24 drives a small pinion 27 which is meshed with a gear 28 formed on the periphery of a clutch plate 29 which is rotatable on a shaft 30 having thereon a second clutch plate 31 and a pinion 32 fixed thereon. The pinion 32 engages a secondary gear 33 which is fixed to a pinion 34 which meshes with a final gear 35 which is fixed upon the screw 26. A follow-up gear 36 meshes with the gear 28 and is therefore rotated whenever the motor 24 drives the gear 27. The follow-up gear 36 is mounted on a shaft 37 which projects from the casing 38 of the transmission mechanism 25 and has thereon a worm 39 which drives a limit switch mechanism 40 whenever the motor 24 is operated.

The limit switch mechanism 40 includes a screw 41 having a worm gear 42 fixed thereon which is rotated by the worm 39. On this screw 41 there is a traveling block 43 which is moved back and forth by rotation of the screw 41 and actuates snap switches 44 and 45. The snap switches 44 and 45 have projecting therefrom actuating buttons 46 and 46' which are adapted to be pressed inward by springs 47 and 47' arranged to lie in the path of movement of the traveling block 43. For example, when the block 43 is in the position in which it is shown in full lines in Fig. 2, the member 22 of the actuator is in retracted position, the spring 47 will be forced leftwardly, pushing in the associated button 46, thereby actuating the snap switch 44 and effectuating the stopping of the motor 24. The snap switches 44 and 45 are slidably supported on parallel rods 48 disposed substantially parallel to the screw 41, and for the purpose of adjusting these snap switches 44 and 45, a spring 49 is disposed between them so as to force them outward against adjustment screws 50 threadedly supported in the wall of the casing of the limit switch mechanism by which they may be moved inwardly, the outward pressure of the spring 49 moving them outwardly as the screws 50 are rotated so as to move outward.

The clutch plates 29 and 31 cooperate in forming a yieldable means which contributes to the result of transmitting power from the motor 24 to the screw 26 and permits operation of the motor 24 when the screw 26 is held against rotation as the result of a stop effecting discontinuance of the axial movement of the thrust member or outer screw part 22 of the actuator. To improve the frictional characteristics of the clutch which includes the plates 29 and 31, an annular plate 51 of frictional material of desired characteristics is placed between the plates 29 and 31. Resilient means are provided for forcing the plates 29 and 31 toward each other, this resilient means consisting of a number of dished washers 52, the pressure characteristics of which are adjusted by a nut 53 which threads on the shaft 30. This spring, accordingly, is adjusted so as to produce transmission of a desired torque from the clutch plate 29 to the clutch plate 31, as long as the torque required to rotate the screw 26 is less than the torque which the clutch plate 29 is capable of delivering to the clutch plate 31; for example, during the time the link 15, Fig. 1, is moving between its extreme positions, there will be no slippage between the clutch plates 29 and 31, but when an overload condition of operation is produced, as the result of the link or fulcrum 15 reaching its extreme position, the clutch will slip, permitting the screw 26 to remain stationary while the motor continues to drive the gear 28 and the gear 36, which operates the limit switch mechanism 40, until the required limit switch 44 or 45 is actuated. As an example of the adjustment of the positions of the limit switches 44 and 45, let it be supposed that the movement of the thrust bar 22 to move the lever 15 from one of its extreme positions to the other is seven inches, the switches 44 and 45 are spaced so as to control the operation of the motor 24 through a sufficient number of revolutions to move the thrust bar 22 seven and one-eighth inches if no overload reaction were applied thereto by the lever 15 reaching its extreme position.

I claim as my invention:

In an actuator for moving a part into an extended position and thereafter into a retracted position, the combination of a reversible electric motor; a first electric circuit whereby said motor is energized to be driven in one direction; a second electric circuit whereby said motor is energized to be driven in the opposite direction; a first limit switch in said first electric circuit for opening said first electric circuit to deenergize said motor; a second limit switch in said second electric circuit for opening said second electric circuit to deenergize said motor; an actuator movable into engagement with one of said switches at each end of the travel of said reversible motor to open the electric circuit in which the switch is located to deenergize and stop the motor; a first chain of gears between said motor and said actuator, said first chain of gears comprising a non-slipping driving connection for positively driving said actuator at all times during rotation of said motor; a driven member movable between extended and retracted positions; a second chain of gears for driving said driven member; a clutch constituting a driving connection between one of the gears of said first chain of gears and one of the gears of said second chain of gears, said clutch permitting said motor to operate said first chain of gears and said actuator independently of said second chain of gears and said driven member, a first fixed stop at one end of the travel of said driven member, said first stop being positioned to prevent movement of said driven member beyond a predetermined extended position, and said stop being positioned to be engaged by said driven member to arrest movement thereof before said motor is deenergized by the opening of one of the said limit switches; and a second fixed stop at the opposite end of the travel of said driven member said second stop being positioned to prevent movement of said driven member beyond a predetermined retracted position, said stop being positioned to be engaged by said driven member to arrest movement thereof before the other of said switches is opened to deenergize said motor.

JAMES E. CHAPMAN.

(References on following page)

REFERENCES CITED

The following references are of record in the file of this patent:

UNITED STATES PATENTS

| Number | Name | Date |
|---|---|---|
| Re. 22,574 | Collins | Dec. 5, 1944 |
| 2,059,366 | Kinzie | Nov. 3, 1936 |
| 2,073,967 | Kiefer | Mar. 16, 1937 |
| 2,114,013 | Ball | Apr. 12, 1938 |
| 2,324,211 | Hodgson | July 13, 1943 |
| 2,328,897 | Gill | Sept. 7, 1943 |
| 2,391,470 | May | Dec. 25, 1945 |
| 2,424,492 | Morris | July 22, 1947 |